(12) United States Patent
Shukla et al.

(10) Patent No.: US 7,801,020 B2
(45) Date of Patent: Sep. 21, 2010

(54) MOBILE CHANNEL ESTIMATION ALGORITHM FOR DVB-H COFDM DEMODULATOR

(75) Inventors: Parveen K. Shukla, Nottingham (GB); Thushara Hewavithana, Borehamwood (GB); Bernard Arambepola, Enfield (GB)

(73) Assignee: Intel Corporation, Santa Clara, CA (US)

( * ) Notice: Subject to any disclaimer, the term of this patent is extended or adjusted under 35 U.S.C. 154(b) by 303 days.

(21) Appl. No.: 11/846,659

(22) Filed: Aug. 29, 2007

(65) Prior Publication Data

US 2009/0059961 A1 Mar. 5, 2009

(51) Int. Cl.
*H04J 11/00* (2006.01)
*H03K 7/08* (2006.01)

(52) U.S. Cl. .................. 370/208; 370/206; 370/209; 370/210; 375/238; 375/239; 375/243

(58) Field of Classification Search ............... 370/498, 370/500, 203, 206–210; 382/254
See application file for complete search history.

(56) References Cited

U.S. PATENT DOCUMENTS

| | | | | |
|---|---|---|---|---|
| 7,257,155 B2* | 8/2007 | Huang | ............... | 375/231 |
| 7,391,833 B2* | 6/2008 | Kim et al. | ............... | 375/351 |
| 7,397,869 B2* | 7/2008 | Ginesi et al. | ............... | 375/326 |
| 7,426,240 B2* | 9/2008 | Peron | ............... | 375/260 |
| 7,447,277 B2* | 11/2008 | Yajima et al. | ............... | 375/326 |
| 2006/0039515 A1* | 2/2006 | Lee et al. | ............... | 375/355 |
| 2006/0203710 A1* | 9/2006 | Mukkavilli et al. | ............... | 370/208 |
| 2006/0222099 A1* | 10/2006 | Varadarajan et al. | ............... | 375/260 |
| 2006/0228040 A1* | 10/2006 | Simon et al. | ............... | 382/254 |
| 2006/0239364 A1* | 10/2006 | Wilhelmsson | ............... | 375/260 |
| 2006/0239367 A1* | 10/2006 | Wilhelmsson et al. | ............... | 375/260 |
| 2007/0053281 A1* | 3/2007 | Schwoerer | ............... | 370/208 |
| 2007/0133391 A1* | 6/2007 | Roh et al. | ............... | 370/208 |
| 2007/0140323 A1* | 6/2007 | Patel et al. | ............... | 375/149 |
| 2007/0230601 A1* | 10/2007 | Yim et al. | ............... | 375/260 |
| 2007/0254592 A1* | 11/2007 | McCallister et al. | ............... | 455/67.11 |
| 2007/0280366 A1* | 12/2007 | Aytur et al. | ............... | 375/260 |
| 2008/0018802 A1* | 1/2008 | Yu | ............... | 348/728 |
| 2008/0084817 A1* | 4/2008 | Beckman et al. | ............... | 370/210 |
| 2008/0118006 A1* | 5/2008 | Krishnan et al. | ............... | 375/324 |
| 2008/0152018 A1* | 6/2008 | Ma et al. | ............... | 375/240.28 |
| 2008/0159420 A1* | 7/2008 | Tseng et al. | ............... | 375/260 |

(Continued)

OTHER PUBLICATIONS

Digital Video Broadcasting (DVB): Framing, structure, channel coding and modulation for digital terrestrial television, EN 300 744, V 1.5.1, Nov. 2004.

(Continued)

*Primary Examiner*—Aung S Moe
*Assistant Examiner*—Benjamin Elliott
(74) *Attorney, Agent, or Firm*—Carrie A. Boone, P.C.

(57) ABSTRACT

A mobile channel estimation algorithm is disclosed, for use in a DVB-H coded OFDM demodulator. The mobile channel estimation algorithm estimates the mobile channel transfer function, overcoming many of the delay spread limitations without using time filtering and without having to collect many OFDM symbols. Once the channel estimate has been found for each symbol, equalization and inter-carrier-interference cancellation may be carried out relatively easily using known methods. The mobile channel estimation algorithm may be used in DVB-H as well as in other areas of OFDM.

18 Claims, 13 Drawing Sheets

U.S. PATENT DOCUMENTS

| | | | |
|---|---|---|---|
| 2008/0192843 A1* | 8/2008 | Tenny et al. | 375/260 |
| 2008/0240263 A1* | 10/2008 | Li | 375/260 |
| 2008/0271141 A1* | 10/2008 | Goldman et al. | 726/22 |
| 2009/0059781 A1* | 3/2009 | Tseng et al. | 370/201 |
| 2009/0059885 A1* | 3/2009 | Sadek et al. | 370/343 |
| 2009/0059961 A1* | 3/2009 | Shukla et al. | 370/500 |
| 2009/0067519 A1* | 3/2009 | Baggen et al. | 375/260 |
| 2009/0070847 A1* | 3/2009 | Furman et al. | 725/131 |
| 2009/0154547 A1* | 6/2009 | Yousef | 375/240.01 |

OTHER PUBLICATIONS

Digital Video Broadcasting (DVB): Transmission system for handheld terminals (DVB-H), EN 302 304, V 1.1.1, Nov. 2004.

* cited by examiner

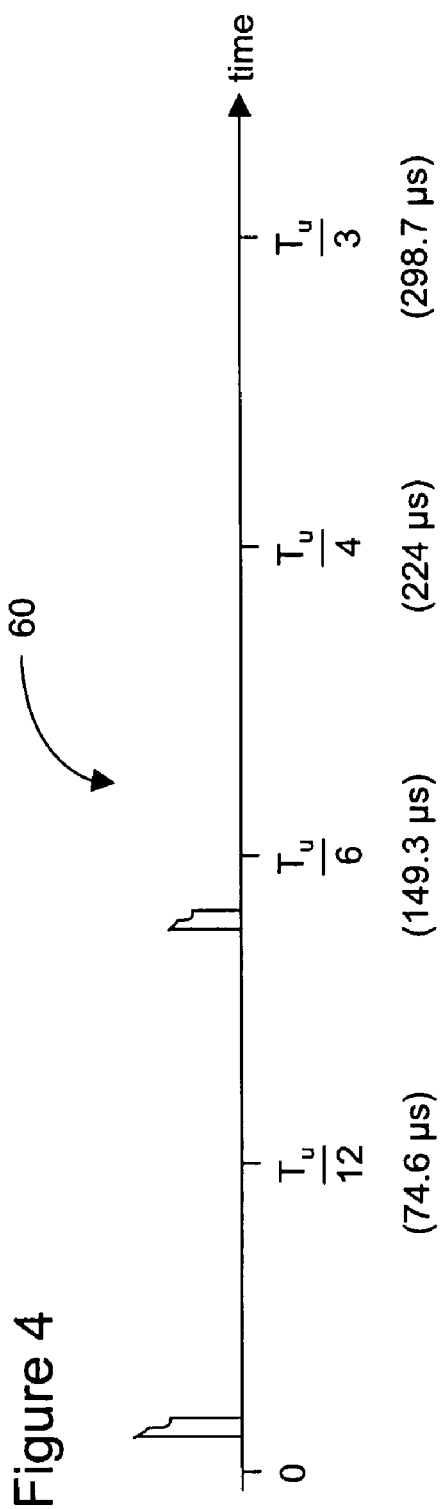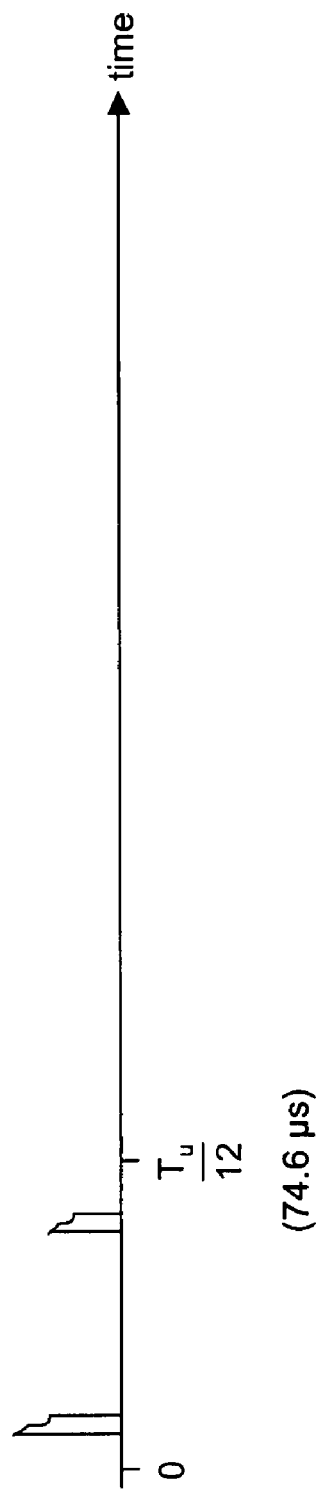
Figure 4
Figure 5

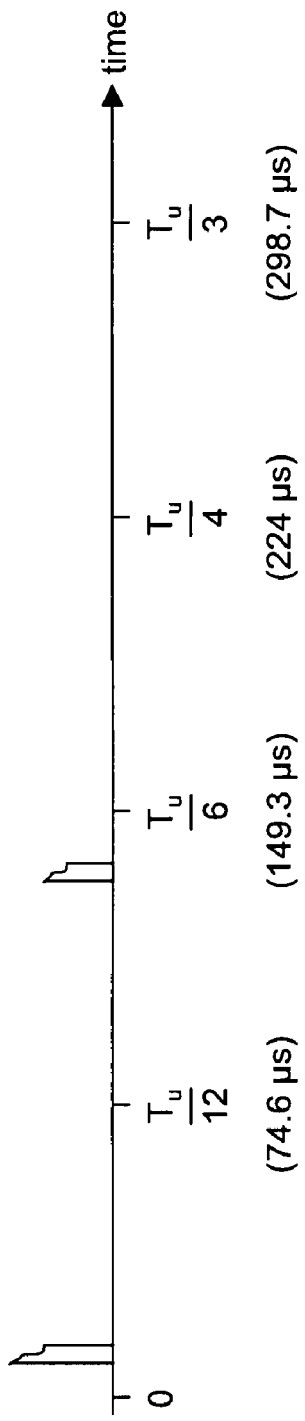
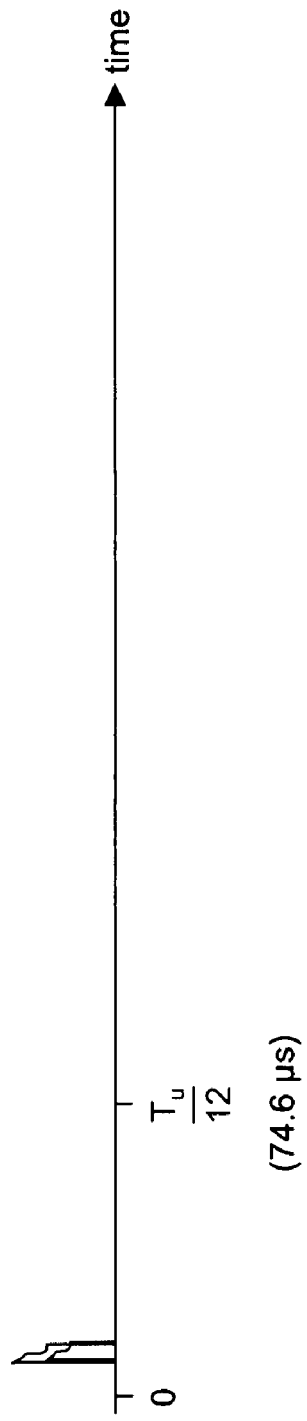

MOBILE CHANNEL ESTIMATION ALGORITHM FOR DVB-H COFDM DEMODULATOR

TECHNICAL FIELD

This application relates to channel estimation and, more particularly, to channel estimation in digital video broadcasting demodulators.

BACKGROUND

Mobile digital television is an emerging technology supported in some mobile computers. One of the standards, DVB-H, short for digital video broadcasting—handheld, is a time-sliced version of DVB-T used for digital terrestrial television. The DVB-T demodulator generates a high-bit-rate MPEG2 transport stream. The transport stream is time-sliced into individual services. For example, a 1 megabit-per-second (Mbps) service for a small display may be generated by time-slicing a 10 Mb transport stream into 100 ms slots every 1 second.

The most important operation in a mobile DVB-H demodulator is estimating the time-varying channel, in other words, accurately estimating the channel frequency response. If this can be done accurately, then it is not that difficult to implement functions like equalization and inter-carrier-interference cancellation. The two known methods for estimating the channel frequency response are to either use the scattered pilots (SPs) of every symbol to do channel estimation or to use time filtering of the SPs.

To reduce power consumption, the tuner and the demodulator are turned on only during the time slice. In practice, it is necessary to allow some time for synchronization and this time has to be minimized to minimize the average power consumption.

Hence, the time available to estimate the channel is very small. This is not a serious issue when the delay spreads of the echo profiles are small, because then a channel estimate may be obtained from the scattered pilots of each symbol. This is not the case for long delay spreads, such as those in single frequency networks.

The scattered pilots method of channel estimation limits the delay spread of the multi-path (i.e. the channel impulse response length) to Tu/12, where Tu is the orthogonal frequency division multiplexing (OFDM) symbol duration. This restriction is unacceptable for single frequency networks designed with typical guard bands of Tu/4 or Tu/8.

To get a reasonable Doppler performance with long delay spreads, as in single frequency networks, it is necessary to use time filtering. In this method, a sliding window is applied over a time sequence of symbols (scattered pilots) to obtain interpolated and filtered versions of the channel estimate. However, note that a scattered pilot pattern repeats every four symbols. Thus, time filtering gives rise to three problems in DVB-H. First, time filtering needs a large memory to store the data symbols, to compensate for the latency of the time filter. This impacts the silicon area and power consumption of a design. Second, time filtering takes more time than the scattered pilots method mentioned above. If the time filter has twelve active taps, then the window size turns out to be about 48 symbols. If the time slice is 100 ms (i.e. 100 8K symbols) then the overhead for time filtering is about 48%, i.e. 48% increase in power consumption. The third problem is the limit on maximum Doppler imposed by the 4-symbol separation of SPs along the time axis. This makes the maximum achievable Doppler 0.125/(Tu+Tg), where Tu and Tg are symbol and guard intervals of the OFDM symbol, respectively. Tu is 896 µs for 8K 8 MHz OFDM. In practice, it is very difficult to get close to this theoretical limit.

Thus, there is a continuing need for an algorithm for mobile DVB-H channel estimation.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 4 is a schematic diagram of an impulse response of a channel, according to some embodiments.

FIG. 5 is a schematic diagram of an impulse response of a second channel, according to some embodiments;

FIG. 6A is a schematic diagram of an echo profile (impulse response) due to two transmitters in a single frequency network, according to some embodiments;

FIG. 6B is a schematic diagram of an impulse response obtained using scattered pilots of one symbol, according to some embodiments;

DETAILED DESCRIPTION

In accordance with the embodiments described herein, a mobile channel estimation algorithm is disclosed, for use in a DVB-H coded OFDM demodulator. The mobile channel estimation algorithm estimates the mobile channel transfer function, overcoming many of the delay spread limitations without using time filtering. Once the channel estimate has been found for each symbol, equalization and inter-carrier-interference cancellation may be carried out relatively easily using known methods. The mobile channel estimation algorithm may be used in DVB-H as well as in other areas of OFDM.

In some embodiments, the mobile channel estimation algorithm is not applicable to all long delay profiles, but is applicable to a high percentage of delay profiles. Accordingly, the mobile channel estimation algorithm provides better Doppler performance than with time filtering.

DVB-H has two types of pilots, continuous pilots (CPs) and scattered pilots (SPs). CPs are somewhat randomly distributed and occur at the same frequencies in each OFDM symbol. SPs are much more structured.

Take an arbitrary symbol as the first symbol. In this symbol, every twelfth carrier is an SP. In the next symbol, the SP locations are shifted by three carrier locations. Hence the SP pattern repeats every four symbols.

Figure 1:
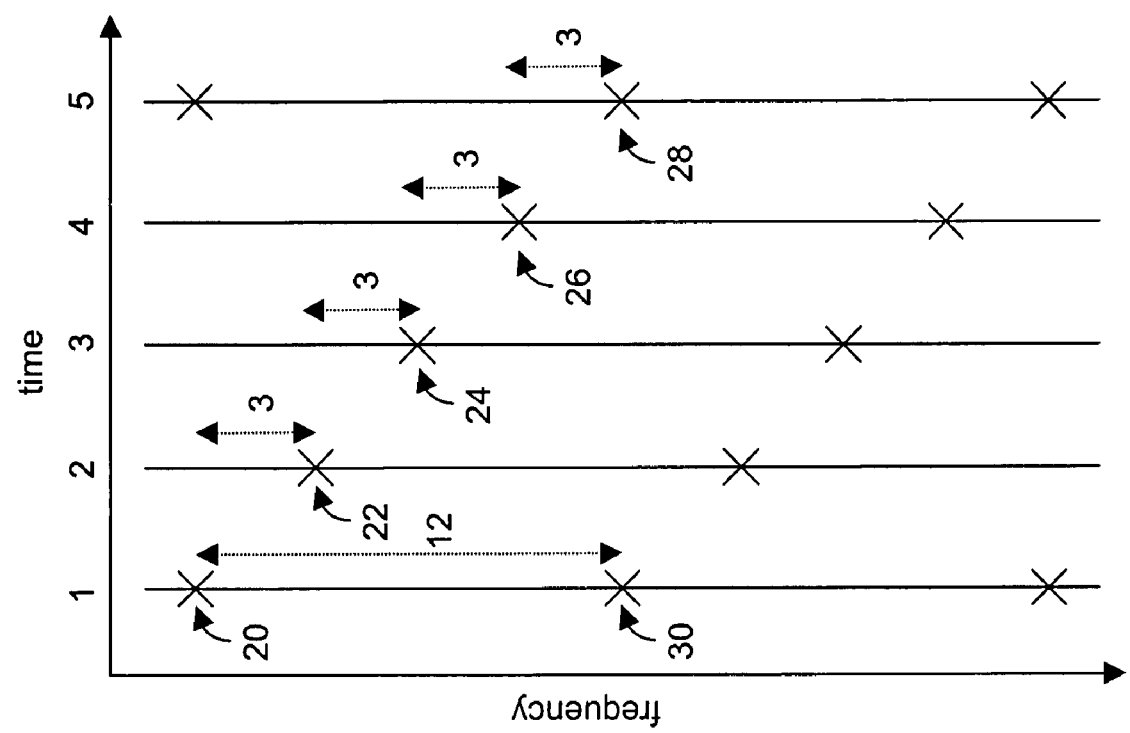
FIG. 1 is a schematic diagram of the distribution of SPs in OFDM symbols, according to the prior art.

FIG. 1 is a schematic diagram of the distribution of SPs in OFDM symbols, according to some embodiments. A first SP 20 is shown at time 1 and at a first frequency. In a next OFDM symbol, the next SP 22 is shifted by three carrier locations, at time 2. The next SP 24, in the next OFDM symbol, is shifted again by three carrier locations, at time 3; the SP 26, at time 4, is shifted by three carrier locations, and the SP 28, at time 5, is shifted by three carrier locations, relative to the previous SP. At the same frequency, the SP 30 starts back at time 1, and the process repeats itself.

The parameter L is used to refer to the spacing between successive scattered pilots in each OFDM symbol. Parameter M is used to define the period of repetition of the scattered pilot pattern, in terms of OFDM symbols. From FIG. 1 it is seen that the values of L and M used in the illustration are twelve and four, respectively.

Let $T_u$ be the symbol period. Then, the carrier separation is $1/T_u$. The scattered pilots of each symbol are spaced at $12/T_u$. Very good Doppler performance can be obtained by using only the SPs of each for channel estimation. However, as the channel estimates are $12/T_u$ apart in the frequency domain, the maximum achievable delay (or echo) spread (in the time domain) is $T_u/12$. In other words, this method fails when echoes in the transmission medium are more than $T_u/12$ seconds apart. Hence, this method is not good enough for single frequency network applications planned for DVB-H.

To maximize delay spread, the SPs may be time-filtered. In this method, a filter/interpolator is applied along each row (i.e. frequency bin) to give channel estimates at the three intermediate points (along time) between two successive scattered pilots. This gives channel estimates at $3/T_u$-spacing in the frequency dimension and hence extends the maximum delay spread of the echo profile to $T_u/3$. However, as mentioned in the preceding section, this method requires a significant amount of extra memory, adds to the time (and hence power) overhead of time-sliced DVB-H, and limits the maximum achievable Doppler.

To illustrate the evolution of the algorithm, assume that the channel is not time-varying. In such a case, there is no need for time filtering because the channel estimates of four successive symbols may be merged to get the channel estimates at $3/T_u$ frequency spacing. This is not the problem to be solved, but rather is a way to describe the idea behind the proposed algorithm.

To get the impulse response of the channel, an inverse FFT is computed. Let the DVB-H mode be 8K. There are 6817 useful carriers in each symbol, of which 568 are SPs. So, if the SPs of four successive symbols are merged, there will be 2272 SPs.

Figure 2:
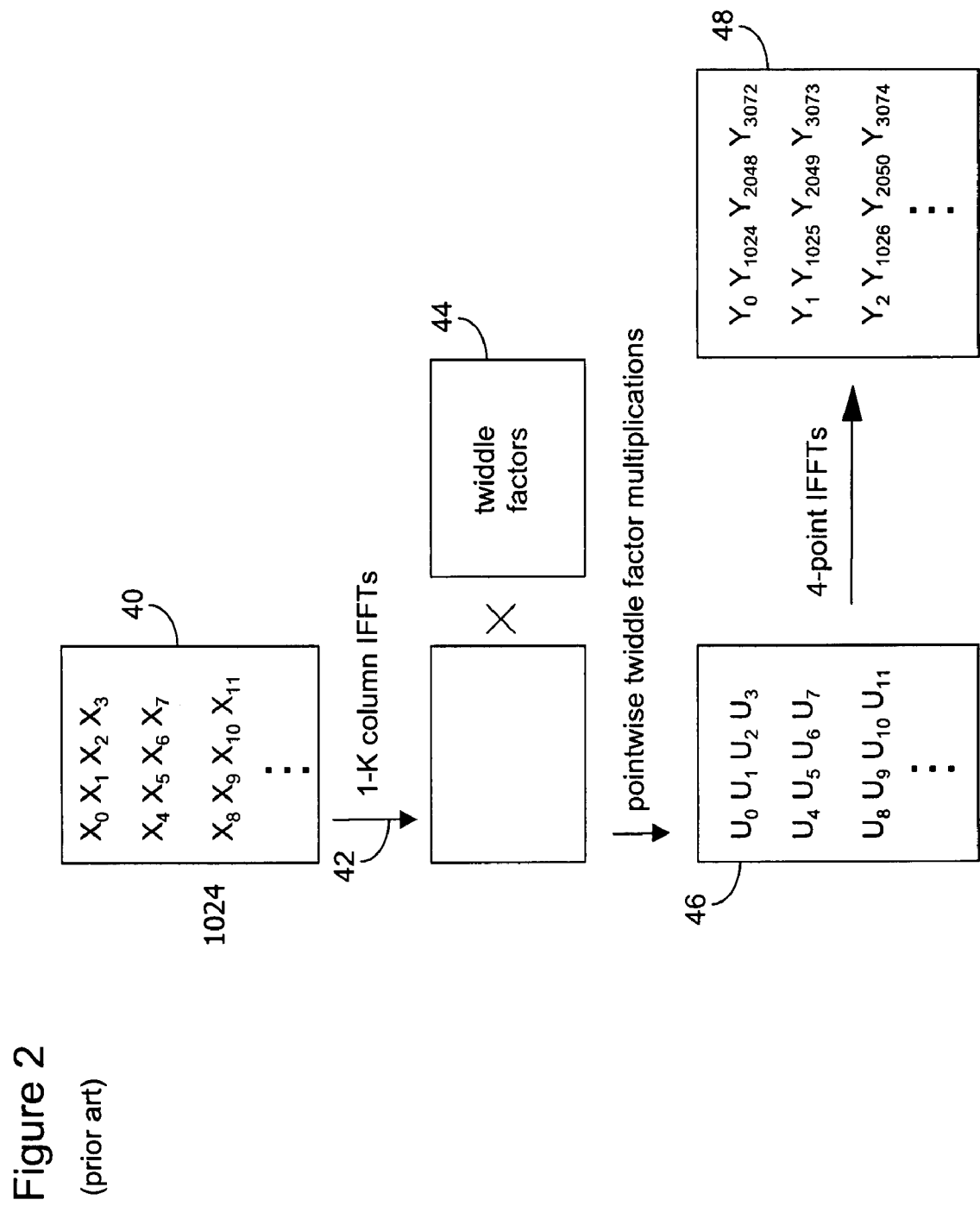
FIG. 2 is a schematic diagram of the inverse fast Fourier transform, according to the prior art.

Assume a 4K-point inverse fast Fourier transform (IFFT) of these 2272 channel estimates is computed, with appropriate zero-padding. To apply the 4K-point IFFT, the 4K-point sequence 40 is mapped into a two-dimensional (2D) array 48, as shown in FIG. 2, with four columns of the X array as the SPs of four successive symbols. FIG. 2 illustrates the well-known IFFT algorithm.

The IFFT operation illustrated in FIG. 2 may be mathematically represented as follows:

$$Y_k = \sum_{i=0}^{4095} X_i \exp\left(\frac{j2\pi i k}{4096}\right) \quad (1)$$

Substitute $i=4i_2+i_1$ and $k=k_2+1024k_1$, where $i_1$ and $k_1$ are in $\{0, 1, 2, 3\}$, and $i_2$ and $k_2$ are in $\{0, 1, \ldots, 1023\}$. With the substitutions and simplifications, the equation becomes:

$$Y_{k_2+1024k_1} = \sum_{i_1=0}^{3} \exp\left(\frac{j2\pi i_1 k_1}{4}\right) \left\{ \exp\left(\frac{j2\pi i_1 k_2}{4096}\right) \left\{ \sum_{i_2=0}^{1023} X_{4i_2+i_1} \exp\left(\frac{j2\pi i_2 k_2}{1024}\right) \right\} \right\} \quad (2)$$

Figure 10:
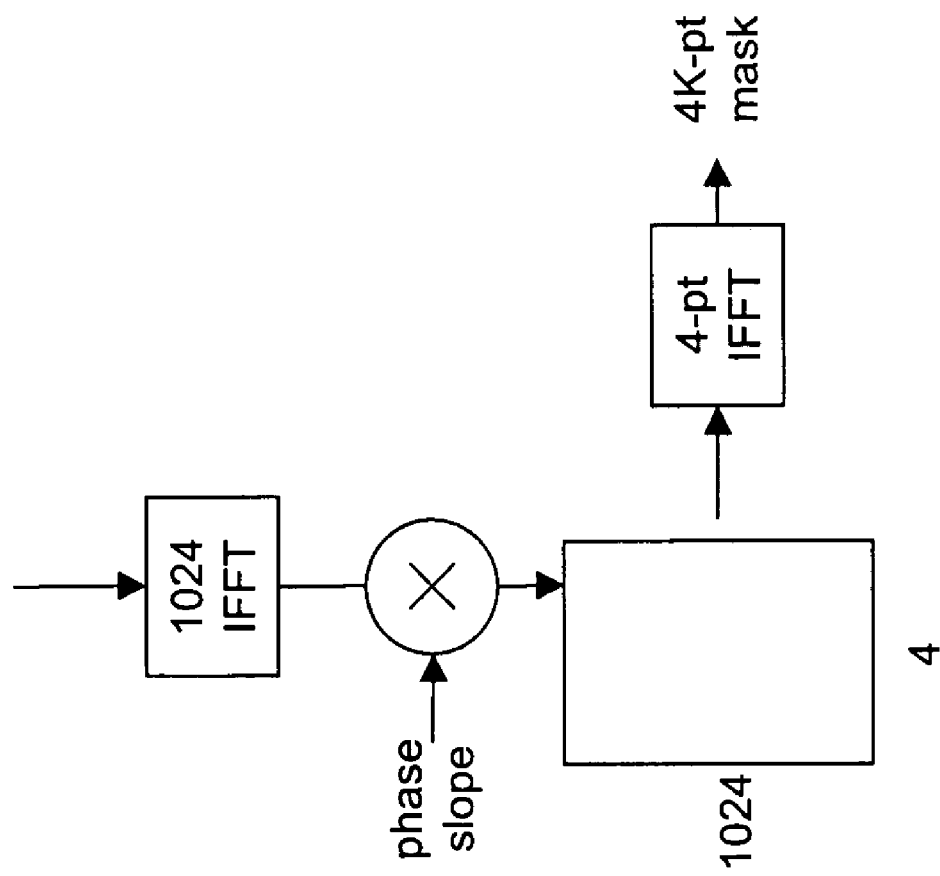
FIG. 10 is an illustration of a mathematical reduction operation used by the algorithm of FIG. 15, according to some embodiments.

This is a well-known IFFT equation. The innermost summation is the 1K-point column IFFT 42. The multiplications outside it by $$\exp\left(\frac{j2\pi i_1 k_2}{4096}\right)$$

are the so-called twiddle factor 44 multiplications of the IFFT. The outer summation corresponds to the 4-point IFFTs. Twiddle factors 44 may also be viewed as doing phase slope correction (see FIG. 10). The SPs of the second symbol are frequency-shifted with respect to those of the first symbol (see FIG. 1). This frequency shift can be compensated for by a linear phase slope correction in the time domain and these are the twiddle factor multiplication. This phase slope correction viewpoint is more suitable for the new algorithm developed in the next few sections.

Figure 3:
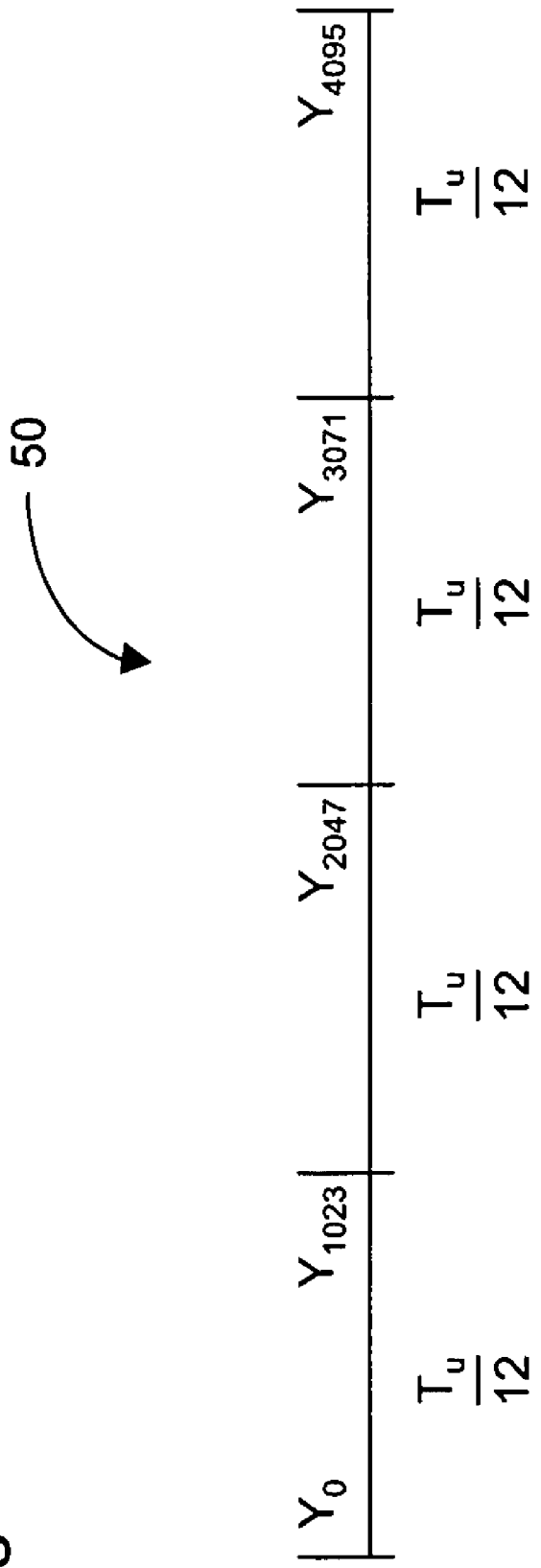
FIG. 3 is a diagram of an impulse response in the time domain of the two-dimensional array of FIG. 2 unfolded, according to some embodiments.

If the final 2D array 48 is unfolded column-wise, the result is an impulse response in the time domain 50, as depicted in FIG. 3. Each of the four columns of the sequence Y 48 in FIG. 2 covers a time interval of $T_u/12$ of the channel impulse response. Hence, for a static channel, it is relatively easy to work out the impulse response with a maximum delay spread of $T_u/3$. As is shown, below, the above method may be extended for time-varying channels.

Returning to FIG. 2, the first column of the input 2D array 40 has the data sequence, $\{X_0 \, X_4 \, X_8 \ldots\}$. The $X_0 \, X_4 \, X_8 \ldots$ contents of the data sequence are actually the scattered pilots of the first symbol of FIG. 1. The second column of the 2D array 40 contains the SPs of the second symbol. The third column of the 2D array 40 contains the SPs of the third symbol. The fourth column of the 2D array 40 contains the SPs of the fourth symbol. Hence, the four column IFFTs of FIG. 2 correspond to the IFFTs of SPs of the individual symbols. If the delay spread of the channel is less than $T_u/12$, then each of these IFFTs will give the complete channel impulse response. Then, there is no need to do any processing beyond the 1K-point IFFTs.

The parameter N is used to define the length of the IFFT in the general case. For the specific illustration given in this description the value of N is 1024.

This is the case for a TU6-type channel profile, widely used in mobile system modeling (a six-path Typical Urban channel profile). A TU6-type channel profile has a delay spread of about 5 µs. The value of $T_u$ (for 8 MHz OFDM) is 896 µs. Hence $T_u/12$ is 74.6 µs, which is much greater than the delay spread of the TU6 channel.

However, DVB-H is intended to work in large single frequency networks (SFN). Hence, broadcasters have chosen guard ratios of ⅛ or ¼ to allow for SFN signals that may be present in addition to the aforementioned TU6 profile.

Therefore, it may be assumed that the receiver sees two transmitters, one near and one far. The signal from each transmitter is dispersed by local objects. Hence each transmitted signal results in a TU6 profile. So the receiver gets two TU6 signals separated in time.

An impulse response 60 of the above channel takes the form shown in FIG. 4, according to some embodiments. If only the SPs of individual symbols are used to work out the channel impulse response (i.e., only the 1K-point IFFTs in FIG. 2), there will be aliasing of this impulse response, as shown in the impulse response 70 of FIG. 5. Therefore the channel estimate will be wrong and the system will fail.

Figure 15:
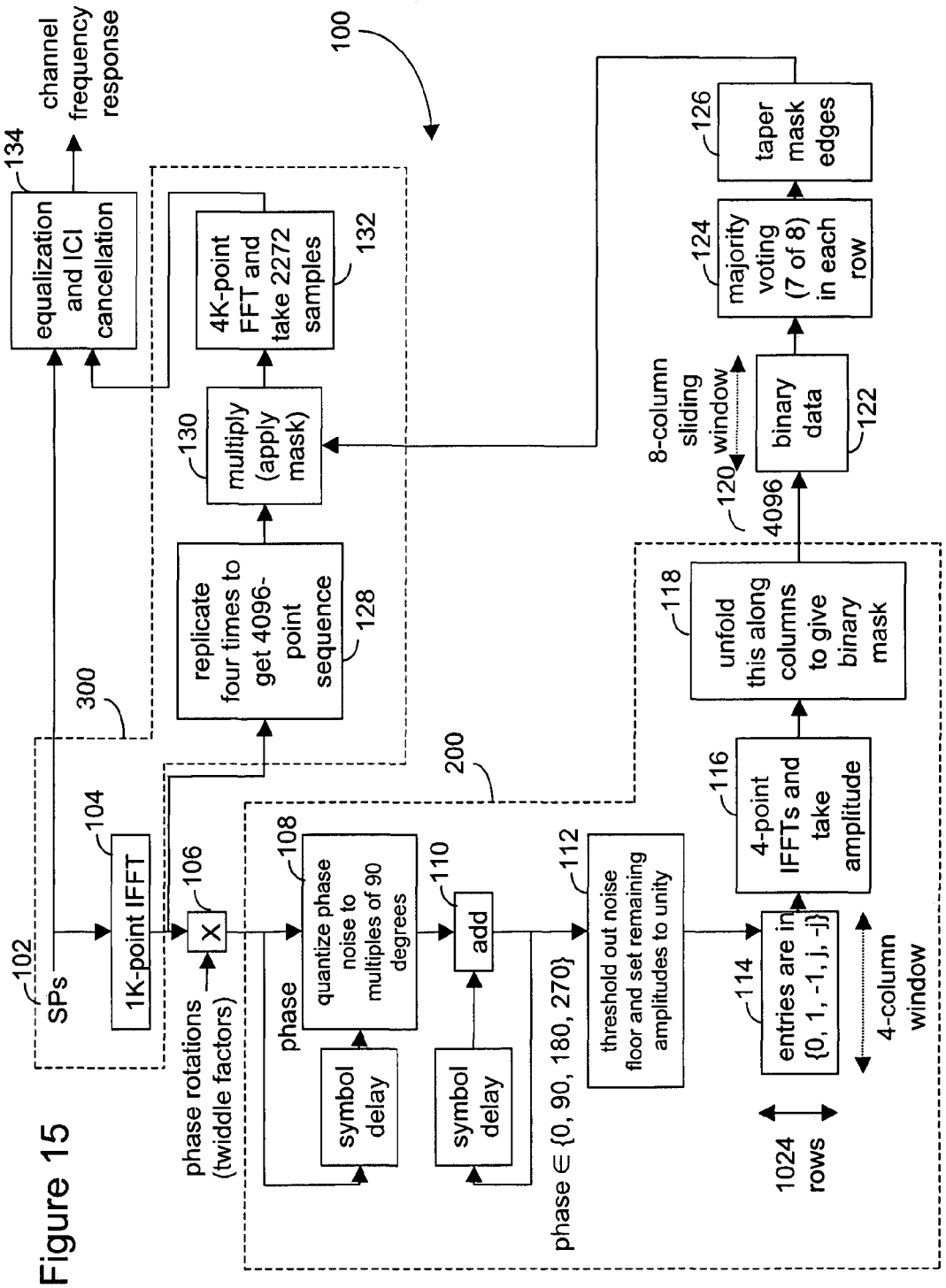
FIG. 15 is a schematic diagram of operations performed by a mobile channel estimation algorithm, according to some embodiments.

An algorithm 100 is depicted in FIG. 15, according to some embodiments. The algorithm 100 resolves the situation described above and recovers the channel impulse response of FIG. 4 from SPs of individual symbols (without any time filtering).

For the illustration above, only two main paths are used. In contrast, the algorithm 100 works for any number of echoes. The algorithm 100 works for many echo profiles, but not all. Hence, the algorithm 100 has a limitation that any second echo cannot alias over the first one when folded into the $T_u/12$ domain. This limitation is illustrated using FIGS. 6A and 6B, according to some embodiments. FIG. 6A shows an echo profile (impulse response) 80 due to two transmitters in the SFN. FIG. 6B shows the impulse response 90 obtained using SPs of one symbol.

Given that the width of the TU6 response is 5 µs and that $T_u/12$ (for 8 MHz, 8K) is 74.5 µs, the probability of aliasing is small. (Also, note that $T_u/12$ is even longer for 6 MHz channels, making this probability even smaller.)

The complete system is designed as follows. When the algorithm 100 may be used, i.e. when the echoes are not like in FIGS. 6A and 6B, the algorithm 100 is used to give very good Doppler performance. This is likely to cover a significant percentage of the echo scenarios. However, when the echoes are like in FIGS. 6A and 6B, the algorithm 100 employs a relatively short time filter to give moderate Doppler performance. So, the algorithm 100 gets very good Doppler performance under most conditions and moderate Doppler performance under few conditions.

The algorithm 100 does not need to store many symbols to do long time filtering and does not have to extend the time slice (and hence increase power) to enable long time filtering. Hence the algorithm 100 gives both hardware and power savings for DVB-H applications.

Returning to FIG. 2, assume that all the operations up to and including twiddle factor multiplications have been done. The only operation left is the 4-point row IFFTs, shown in FIG. 7.

Note that in FIG. 2, the time variations of the channel are ignored. The channel is assumed to be static. So, if the channel is time-varying, then calculating the 4-point IFFTs, as done in FIG. 2 (and also shown in FIG. 7), will produce an erroneous channel impulse response. It really will not give any Doppler performance at all. Hence, before doing the 4-point IFFTs, some additional processing is introduced, in some embodiments.

Figure 7:
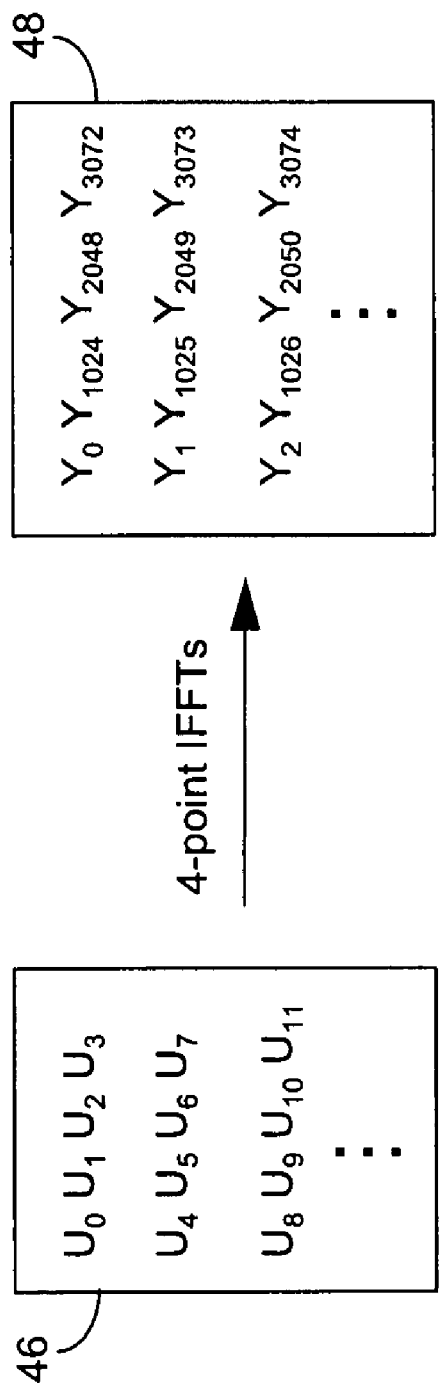
FIG. 7 is a block diagram of a 4-point row inverse fast Fourier transform, according to some embodiments.

The limitation introduced with reference to FIGS. 6A and 6B implies the following. If any row of the 2D array 48 of FIG. 7 is taken, one and only one of the four Y values can have a non-zero value. For example, considering the second row, if $Y_{1025}$ is non-zero, then $Y_1$, $Y_{2049}$ and $Y_{3073}$ have to be zero. Given this limitation, the problem is to reliably find the most likely component that is non-zero, using only a very small number of symbols outside the time slice.

Figure 8:
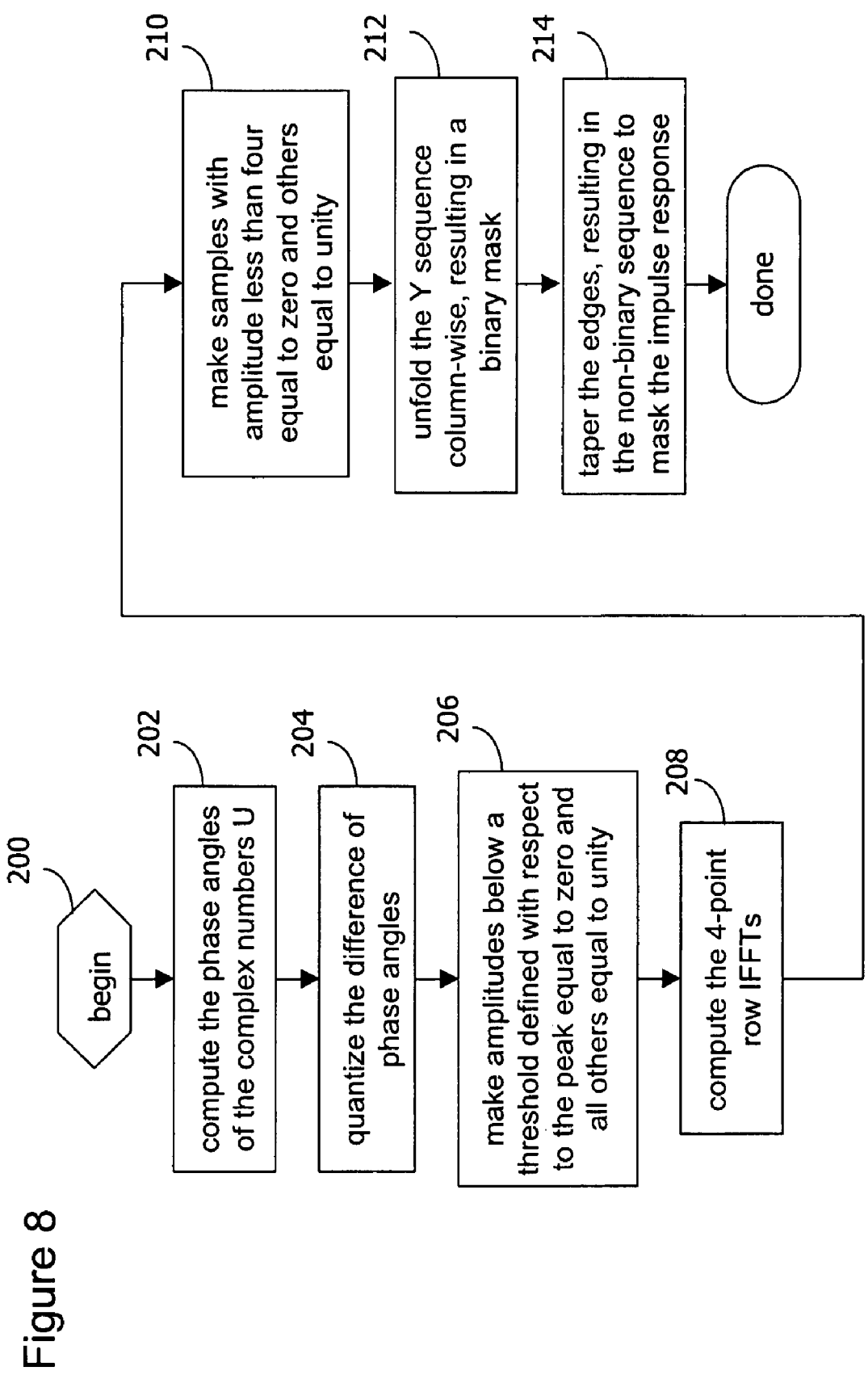
FIG. 8 is a flow diagram of the impulse response mask generator of the algorithm of FIG. 15, according to some embodiments.

The algorithm 100 solves the problem in two stages. In the first stage, the algorithm 100 obtains a mask. In the second stage, the algorithm 100 computes the sequence, Y, namely the channel impulse response. The algorithm 100 updates the mask and the channel impulse response for every new symbol. To work out the mask, the algorithm 100 includes a procedure 200, which may be called an impulse response mask generator 200, to transform the 2D array 46, according to some embodiments. The operation of the impulse response mask generator 200 is illustrated in the flow diagram 200 of FIG. 8.

The impulse response mask generator 200 begins by computing the phase angles of the complex numbers, U, in the 2D array 46 (block 202). In some embodiments, to save hardware, a crude approximation to phase is adequate, for example, that obtained using the first few iterations of a known iterative algorithm. Next, the impulse response mask generator 200 quantizes the differences of phase angles (block 204).

To illustrate the quantization step, an example is used. Consider the second row of the 2D array 46 (FIG. 7). Let the four phase angles be $\theta_4$, $\theta_5$, $\theta_6$, and $\theta_7$. The impulse response mask generator 200 first subtracts set, $\theta_4$, from all four angles. Let the resulting four angles be $\phi_4$, $\phi_5$, $\phi_6$, and $\phi_7$. Since $\theta_4-\theta_4=0$, the value of $\phi_4$ is zero.

Next, the impulse response mask generator 200 computes the three phase differences $(\phi_5-\phi_4)$ $(\phi_6-\phi_5)$, and $(\phi_7-\phi_6)$. The results are quantized to the nearest integer multiple of $\pi/2$. Let these results be $\Delta\phi_{54}$, $\Delta\phi_{65}$, and $\Delta\phi_{76}$. For example, if $(\phi_5-\phi_4)$ is 100 degrees, the quantized value, $\Delta\phi_{54}$, is set to 90 degrees ($\pi/2$). If the difference is 240 degrees, the quantized value, $\Delta\phi_{54}$, is set to 270 ($3\pi/2$).

Next, the impulse response mask generator 200 replaces $\theta_4$, $\theta_5$, $\theta_6$, and $\theta_7$ in the sequence, $\{U_i\}$, with $\{0, \Delta\phi_{54}, (\Delta\phi_{54}+\Delta\phi_{65}), (\Delta\phi_{54}+\Delta\phi_{65}+\Delta\phi_{76})\}$. This process is repeated for all rows. Then, all the new phase angles, $\Psi_i$, of the 2D array 46 will be integer multiples of $\pi/2$. Stated mathematically $$\psi_i \in \left\{0, \frac{\pi}{2}, \pi, \frac{3\pi}{2}\right\}.$$

After the impulse response mask generator 200 has quantized the differences of phase angles, the amplitudes of all the values of the 2D array 46 are set. Amplitudes below a threshold defined with respect to the peak are set to zero and all others are set to unity value, in some embodiments (block 206). This may be done because, as the mask is worked out, the amplitude information of the values is unimportant. After the above operations, all the elements of the 2D array 46 will be either purely real or purely imaginary numbers with unit amplitude. Stated mathematically, the elements of the 2D array 46 are in the set, $\{1, j, -1, -j\}$.

The impulse response mask generator 200 next computes the 4-point row IFFTs (block 208). There are two possibilities. The first is that there is no coherent summation in the 4-point IFFT. Then the magnitudes of the four IFFT outputs for this row will be less than four. This implies that there is no impulse response component in these four samples and hence these are set to zero. The second possibility is that there is a coherent summation via the 4-point IFFT. This will make the magnitude one of the four samples equal to four and all other three samples will be zero. This value is normalized to unity (block 210). The impulse response mask generator 200 then unfolds the sequence 48 column-wise, resulting in the binary mask (block 212). The edges are then tapered. The resulting non-binary sequence is used to mask the impulse response (block 214).

If it is assumed that only one of the four values in each row of the 2D array 48 (FIG. 7) is non-zero (in the absence of noise), then, if the channel is static, then the phase angles of the corresponding row of the 2D matrix 46 will be such that these will coherently add for one and only one specific output of the 4-point IFFT. This is the reason that the impulse response mask generator 200 quantizes the phase differences. However, this is not the case for mobile channels, because the phase angles are likely to be disturbed by Doppler. Hence, quantizing the phase differences to the nearest multiple of $\pi/2$ is equivalent to constructing the static equivalent of this mobile channel. Since the impulse response mask generator 200 is only interested in generating a mask, the amplitudes (that are above the noise threshold) are set to one. The computations of the impulse response mask generator 200 may be implemented in hardware in a straightforward manner, in some embodiments.

Usually, only a few values of the channel impulse response will be non-zero.

The algorithm 100 may be corrupted by noise. To show this, assume that the second row of the 2D array 48 does not have an impulse response component. Then, all the four values of U in the second row of the 2D array 46 will be noise samples. Hence, the four phase angles $\phi_4$, $\phi_5$, $\phi_6$, and $\phi_7$ will be random variables with a uniform probability distribution between 0 and $2\pi$. It is easy to show that, after quantization, the probability of all the four quantized phase angles being equal to zero, is ($1/256$). In some embodiments, there are sixteen possible phase angle combinations that can add coherently to give a false peak. Hence the probability of a false value in the impulse response of this second row is $1/16$.

This "false alarm" probability is much too high. In some embodiments, the algorithm 100 reduces the probability significantly by thresholding out the noise of the 2D array 46 before applying the impulse response mask generator 200. Note that each column of the 2D array 46 has been obtained using a 1024-point column IFFT of the scattered pilots (SPs). Since there are 568 active SPs, if there is only one impulse in the impulse response, then there will be a signal-to-noise ratio (SNR) gain of $10 \log_{10}(568)=27.5$ dB in the IFFT. So if the system input SNR is (typical) 15 dB, the noise floor in the U sequence with respect to impulse response will be 42.5 dB. In practice, this will not be this good because the signal power will be split between several impulses in the impulse response and because the impulses may not coincide with the time-points of the IFFT. Nevertheless, there will be a sufficient SNR after the 1024-point to eliminate much of the noise floor.

In a real system, the threshold can be chosen to be about 25 dB below the peak amplitude of each 1024-point IFFT. Samples with amplitude below this can be set to zero. Hence, after the amplitudes of the values of the array 46 are set to unity (block 206), samples of the 2D array 46 are in the set $\{0,$ $1, j, -1, -j\}$. In some embodiments, this reduces the probability of false values in the impulse response mask well below $1/16$.

Nevertheless, to obtain a theoretical upper bound for false alarm probability, the algorithm 100 does not assume noise thresholding of the noise floor. Noise thresholding is considered to be a practical measure to significantly lower the false alarm probability.

Figure 9:
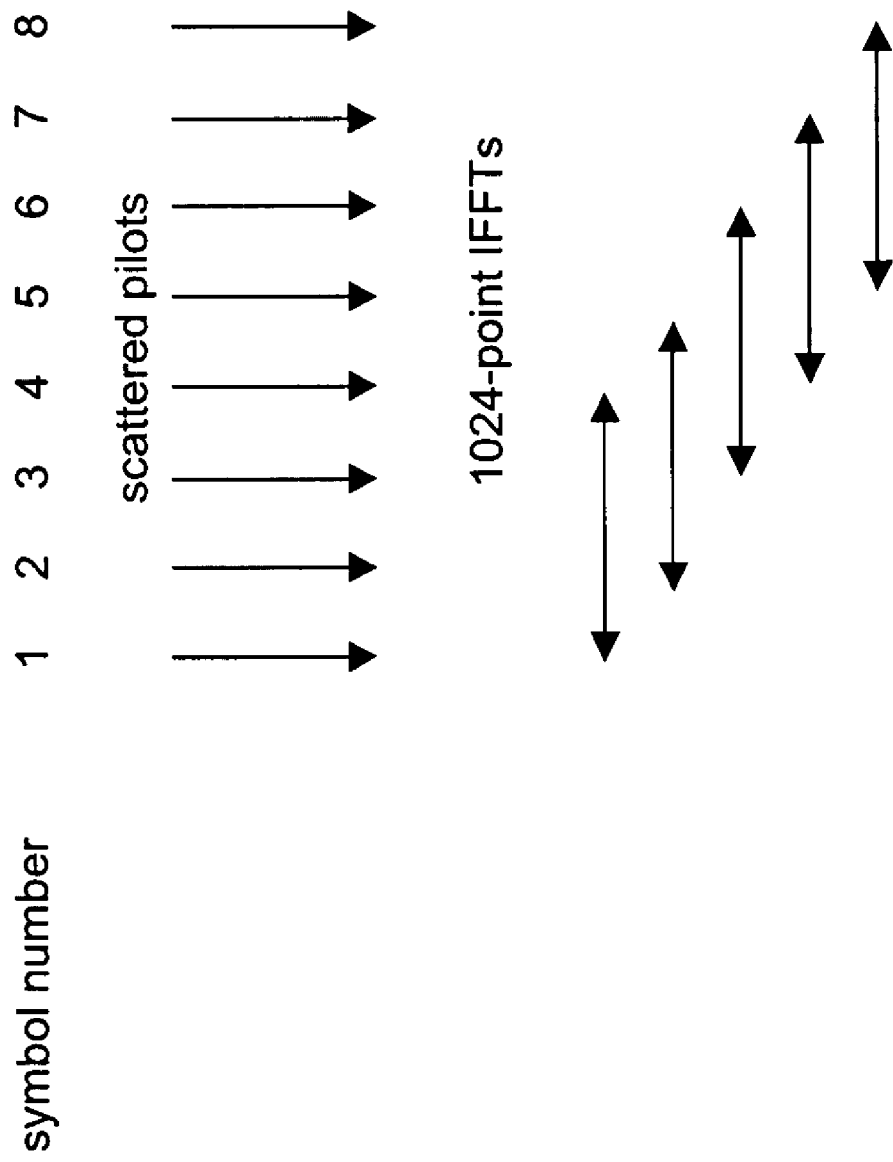
FIG. 9 is an illustration of an eight-column sliding window, used by the algorithm of FIG. 15, according to some embodiments.

To reduce false alarm probability, the algorithm 100 may be implemented over a sliding window of symbols, as indicated in FIG. 9, according to some embodiments. When a new symbol is obtained, it is used with the three preceding symbols to implement the impulse response mask generator 200 and to obtain a new mask. Subsequently, the impulse response mask generator 200 is implemented for every new received symbol.

In some embodiments, mathematical reduction operations are performed to simplify the algorithm 100. For example, the 1024-point SPs of the new symbol (including noise thresholding) may be multiplied with a phase slope (these are twiddle factors for this column). Then, the phase differences with respect to the previous symbol may be worked out and the quantized phase angles inserted into the (1024×4) array. In effect, this can be made very easily into a simple sliding window processing operation. In this manner, for every received symbol, there is a new mask. This process is illustrated schematically in FIG. 10, according to some embodiments.

The algorithm 100 is further capable of reducing the false alarm probability. Recall that, with four symbols (symbols 1, 2, 3 and 4), as in FIG. 7, there will be a false alarm probability due to noise of $1/16$ (though this can be reduced significantly by noise thresholding). In some embodiments, the algorithm 100 computes the mask with symbols 2, 3, 4 and 5 (using the simplified sliding window approach given above) and logically ANDs this with the mask from symbols 1, 2, 3 and 4. This additional operation has theoretically been shown to reduce the false alarm probability down to $1/64$ from $1/16$. If the mask from symbols 3, 4, 5, and 6, are included as well, then the probability goes down $1/256$. Every time a new symbol is included into the sliding window, the probability reduces by a factor of four. Therefore, at the end of the eighth symbol, the false alarm probability will be $1/4096$. For many applications, this is adequate because this can be reduced significantly by noise thresholding.

Thus, for the algorithm 100, the overhead for channel estimation is only 8 symbols, in some embodiments. If noise thresholding is taken into account, the overhead is reduced to about 6 symbols, in some embodiments. The number of symbols may be a parameter in the hardware design.

Masks are also stored in a sliding buffer. At any given point, the algorithm 100 stores the last eight masks. From these, the algorithm 100 may compute a mask for the current symbol as the logical AND combination, as described above. If necessary, the logical AND may be replaced with majority decoding, e.g., the combined mask has a value of one if seven out of the eight saved mask values are one. In the above example, the threshold is seven. If the threshold is set to eight, the algorithm 100 gets logical AND mask generation. So, a sliding window of masks with a history of about eight (approximately) symbols is used to generate a mask for the current symbol.

In the general case K successive masks may be saved and the combined mask may be taken to have a value of 1, if at least K1 elements out of the K elements in a row are equal to one. In the above illustration, the value of K is eight and the value of K1 is seven.

Figure 11:
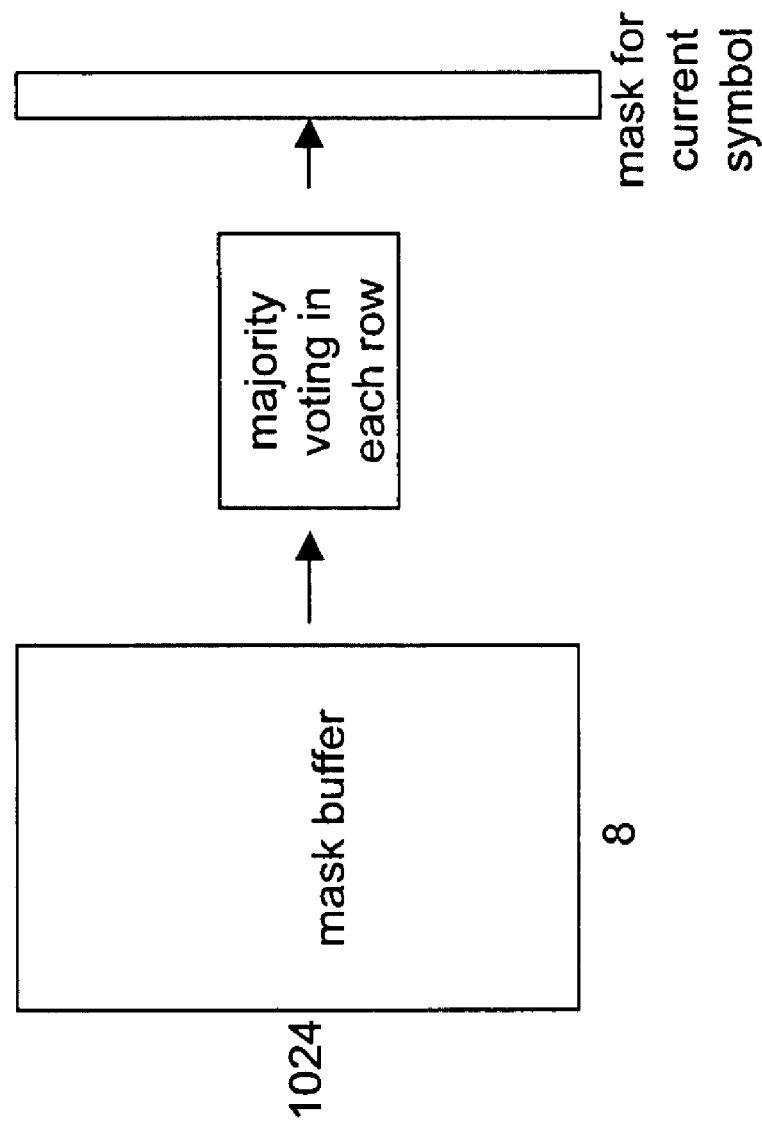
FIG. 11 is an illustration of the majority voting operation performed by the algorithm of FIG. 15, according to some embodiments.

This principle is illustrated in FIG. 11, according to some embodiments. Note that each entry in the mask buffer is a binary (1-bit) variable. The above mask is used to work out the channel impulse response, as described further below.

Figure 12:
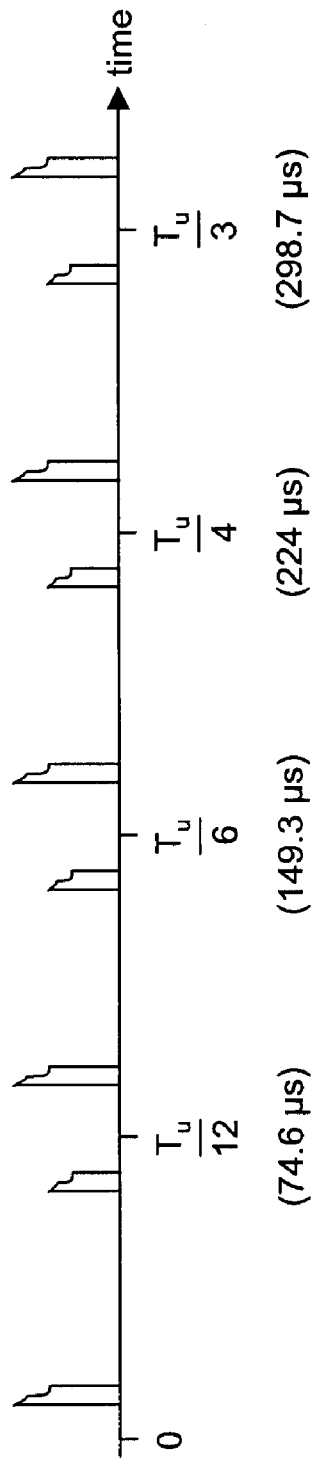
FIG. 12 is an illustration of an extended profile, according to some embodiments.

The algorithm 100 works out the 1024-point IFFTs of the SPs of the current symbol. (In fact, this IFFT has already been worked out to carry out the processing for mask generation.) These 1024 points cover a time interval of $T_u/12$. Echoes outside this time interval are aliased to within this interval (see FIGS. 4 and 5). The algorithm 100 replicates the 1024 points four times to give a 4096-point sequence, at a time interval of $T_u/3$. However, there will be echo ambiguities in this extension. For example, if the actual echo profile is as shown in FIG. 4, the extended profile will take the form shown in FIG. 12.

Figure 13:
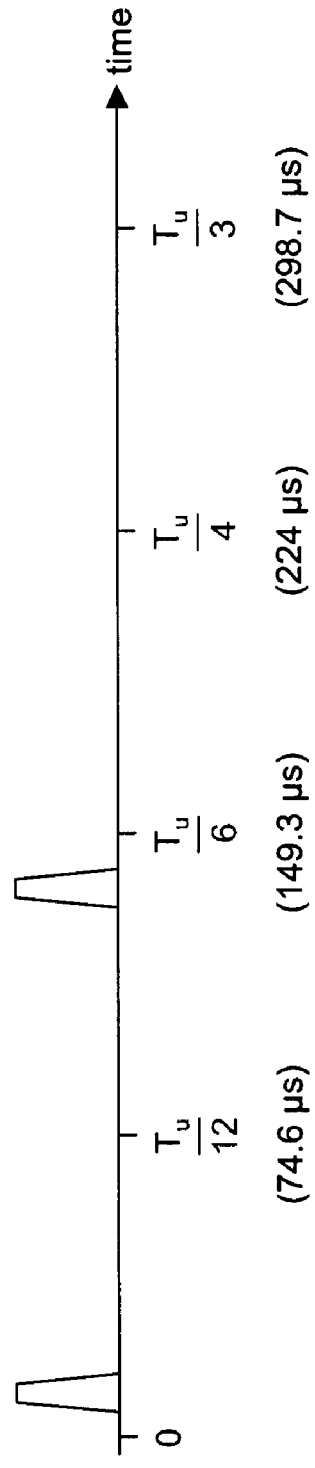
FIG. 13 is an illustration of an impulse response mask, according to some embodiments.

The algorithm 100 then multiplies this replicated sequence with the mask. The mask computed as described above will do the ambiguity resolution. It will have a shape, as shown in FIG. 13.

In some embodiments, masking also does time domain noise filtering of the channel transfer function. This may be important for system operation. The 4K-point FFT of the impulse response is taken to give the channel frequency response. This is used for channel equalization.

Figure 14:
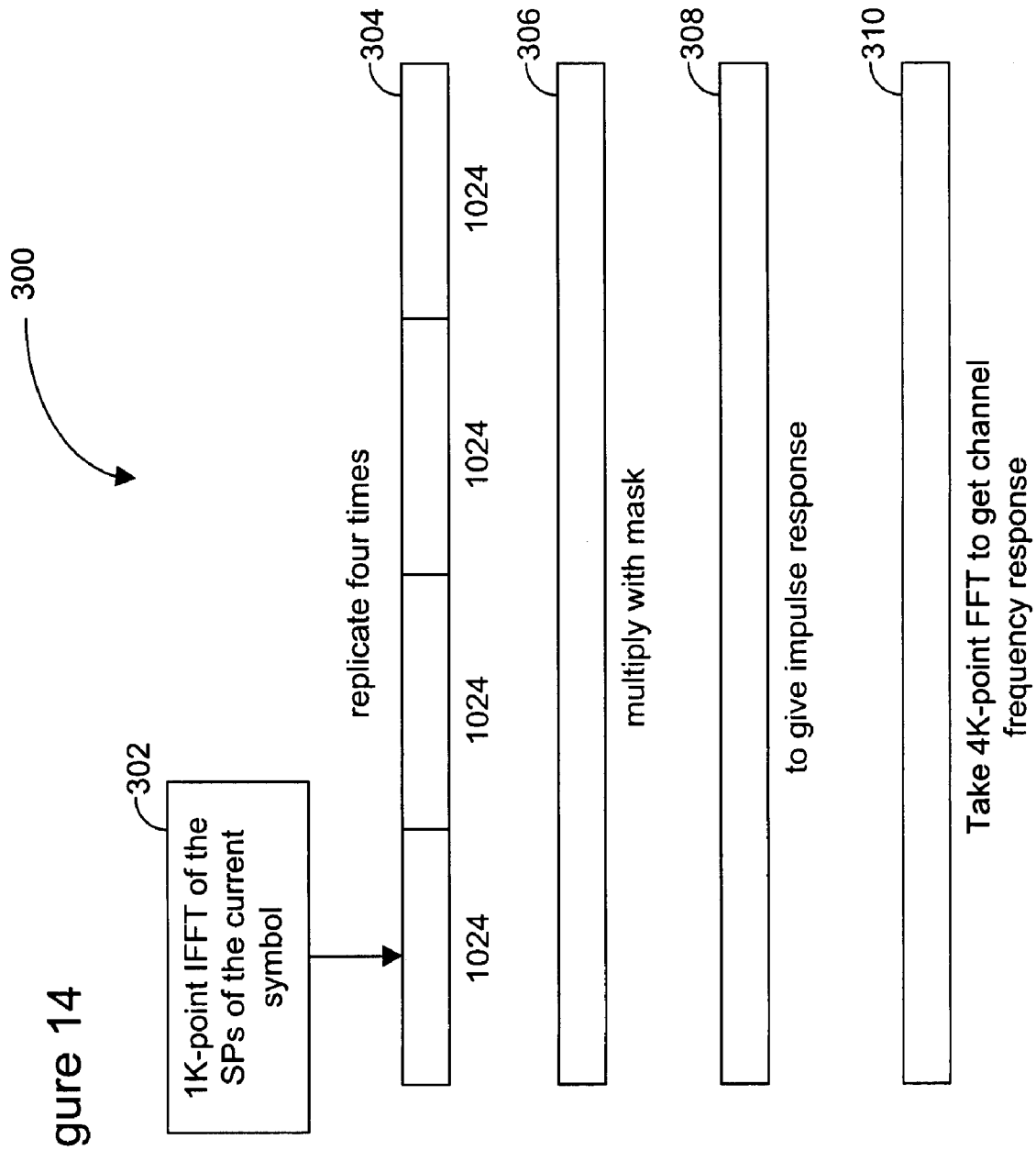
FIG. 14 is a schematic diagram of operations performed by the algorithm of FIG. 15, according to some embodiments.

FIG. 14 is a schematic diagram of the above-described procedure 300 performed by the algorithm 100, according to some embodiments. To summarize, for each OFDM symbol, the procedure 300:

1) computes a 1024-point IFFT of the SPs (zero-padded) (block 302);

2) uses the result of 1) to get a new estimate of the 4096-point binary mask;

3) replicates the 1024-point sequence of 1) four times (block 304);

4) point-wise multiplies (or gates) this with the mask (block 306) to give a 4096-point impulse response in the time domain (block 308). The delay spread of this is not limited to $T_u/12$;

5) computes the 4096-point FFT to get the frequency domain channel response (block 310).

The lengths 1024 and 4096 used above are just examples. These are the appropriate values for 8K OFDM. For 4K and 2K, these numbers may be divided by 2 and 4, respectively. It is necessary to select shorter lengths for 4K and 2K OFDM because symbol duration is smaller by factors of 2 and 4 for these cases. Hence, there exists half and quarter of the 8K time to do the computations, respectively. The same hardware may be used if all the lengths are made shorter by factors of 2 and 4, respectively.

The algorithm 100 has been described using a binary mask. In some embodiments, a binary mask is not used, however. The algorithm 100 is effectively doing a cyclic convolution using frequency domain point-wise multiplication (except that the convolution happens in the frequency domain and the point-wise multiplication happens in the time domain). The length of the FFT is 4096 and the length of the wanted part of the output is 6817/3=2272 samples. Hence, it is clear that the length of the other sequence that is subject to the cyclic convolution has to be less than 1824 samples. The Fourier transform of a square wave could be longer than this, especially if the width is very narrow. Hence, the algorithm 100 replaces the binary mask with a mask slightly tapered at the edges (see FIG. 13). The amount of tapering is chosen to ensure that the Fourier transform is within 1824 samples.

The most important function to achieve good Doppler performance in DVB-H is channel estimation. Once the channel frequency response is known, the OFDM symbol can be equalized and inter-carrier interference removed using known techniques. The algorithm 100 is a new and efficient way to compute the channel transfer function.

FIG. 15 is a block diagram of the algorithm 100, according to some embodiments. The steps shown in FIG. 15 have been described above. In particular, the sub-procedures 200 and 300 of the algorithm 100 are indicated with enclosed dotted lines.

The scattered pilots (SPs) of the symbol (spaced twelve carriers apart) are extracted (block 102). These are subjected to a 1024-point IFFT (block 104). The output of this is made to be in natural (not bit-reversed) order. (This covers a time interval of $T_u/12$, because SPs are $12/T_u$ apart, where $T_u$ is the OFDM symbol period.)

Then a phase slope correction is carried out (block 106). This may be viewed as accounting for the frequency shift of SPs from one symbol to another (see FIG. 1) or as the twiddle factor multiplication stage of the IFFT. Both views are equivalent. (The data may be transformed from Cartesian to Polar coordinates prior to this phase rotation.)

The phase difference between the current and previous symbol are quantized to multiples of $\pi/2$ (block 108). This is then accumulated (block 110). (The symbol delay registers in this processing are initialized to zero.) The amplitudes are thresholded to eliminate much of the noise floor. The remaining non-zero amplitudes are made equal to unity (block 112).

The algorithm 100 thus gets a 1024-point sequence with entries in the set $\{0, 1, -1, j, -j\}$ (block 114). This is included in a 2-D array as follows. The first sequence is column zero, the second sequence is column one, the third sequence is column two, and the fourth sequence is column three. The fifth sequence replaces column zero, the sixth sequence replaces column one, and so on.

The algorithm 100 waits for four symbols before working out the first set of 4-point IFFTs along all rows. After that, the algorithm 100 can work out a new set of 4-point IFFTs for every received symbol. From the outputs of these 4-point IFFTs, the algorithm 100 keeps only the magnitudes that are equal to four, i.e. those that add coherently via the 4-point IFFT (block 116). The 4-point IFFT block 116 in FIG. 15 is a 1024 (vertical) by 4 (horizontal) array of complex numbers, with each number in the set $\{0, 1, -1, j, -j\}$. The 4-point IFFT is actually computed on each of these 1024 rows (as in FIGS. 2 and 7).

This is unwrapped along columns (block 118) to give a 4096-point binary mask (block 120). This binary mask is entered into a sliding window of 8 masks (block 122). It displaces the oldest column. The algorithm 100 majority decodes each 8-point row of this (block 124). Majority decoding is user-programmable. In some embodiments, the algorithm 100 uses seven out of eight decoding to give a binary mask of length 4096. The sharp edges of the mask are tapered (block 126). The mask is then not binary. A 16-level mask (4-bit) is adequate.

In parallel with operations described so far, the algorithm 100 replicates the 1024-point IFFT output four times to give a 4096-point sequence (block 128). This covers a time interval of $T_u/3$. (In hardware, it may be necessary to pass this 1024-point IFFT output through a small latency compensating delay line to account for the time taken for operations in the mask generation path. In FIG. 15, it is assumed that these operations are instantaneous, which is acceptable for the simulation model.) This 4096-point sequence is then multiplied by the 4096-point mask (block 130). A 4096-point FFT is taken. From this, the algorithm 100 takes the 2272-point frequency response at $T_u/3$ locations (block 132).

The operations of FIG. 15 occur for every received symbol. In some embodiments, the hardware architecture shares a single FFT processor for all the FFTs and IFFTs in the algorithm 100. Preferably, the hardware includes a single special purpose arithmetic unit connected to a memory and controlled by a sequencer.

The lengths of 1024 and 4096 mentioned above are for explaining the algorithm. These are appropriate lengths of 8K DVB-H. For 4K, these numbers may be divided by 2. For 2K DVB-H these may be divided by 4. (It is necessary to select shorter lengths for 4K and 2K because the time available for computation is smaller than 8K.) In a general form of the algorithm the length 1024 may be replaced by the integer variable N and 4096 by the integer variable 4N.

The aforementioned processing of the algorithm 100 does the following: echo ambiguity removal; interpolation of frequency response from $12/T_u$ to $3/T_u$; and noise filtering of the frequency response. The frequency response may be used in the following operations: channel equalization of the symbol (point-wise division by the channel frequency response); and inter-carrier interference (ICI) cancellation.

Returning to FIG. 15, a final operation of the algorithm 100 is shown, according to some embodiments. ICI cancellation is done several iterative stages before and after channel equalization (block 134). ICI removal requires the gradient of the channel frequency response in the time dimension. For symbol K, this is taken as the difference between the channel frequency response at symbol (K+1) and that of symbol (K−1). To perform this operation, a storage medium is needed. Also, the channel frequency response and its time differential have to be 1:3 interpolated from $3/T_u$ to $1/T_u$. This is a standard operation in any DVB-H receiver.

The DVB-H standard has been developed specifically to provide broadcast television to mobile devices. There exist computer platforms that can receive mobile TV via DVB-H, such as notebook computers and ultra-mobile personal computers (UMPCs). Most mobile computers, mobile phones, and personal digital assistants (PDAs) are expected to be able to receive mobile TV in the near future. There is a need to support high speeds in fast-moving vehicles, such as cars and trains. Hence, the mobile channel estimation algorithm described herein may be considered as very beneficial for designing power and hardware-efficient integrated circuits for such products.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A method to estimate a frequency response of a channel for use in a demodulation device, the method comprising:

extracting, in the device, scattered pilots of an orthogonal frequency division multiplexed (OFDM) symbol, the OFDM symbol comprising both scattered pilots and continuous pilots, wherein the scattered pilots are spaced a predetermined number (L) of carriers apart with a predetermined period of repetition (M), with the scattered pilot locations shifted in frequency by (L/M) carrier positions from one symbol to the next resulting in a scattered pilot pattern that repeats every M OFDM symbols;

calculating a N-point inverse fast Fourier transform of the scattered pilots to generate a first sequence in the device;

generating a second sequence from the first sequence in the device;

generating an impulse response mask in the device, the impulse response mask comprising:

quantizing a phase difference between current and previous symbols to multiples of $2\pi/M$, wherein the quantizing step comprises the following steps when M=4:

obtaining phase angles $\theta_4$, $\theta_5$, $\theta_6$, and $\theta_7$, from a row of a two-dimensional array U;

subtracting set, $\theta_4$, from each of the phase angles, $\theta_4$, $\theta_5$, $\theta_6$, and $\theta_7$, resulting in angles $\phi_4$, $\phi_5$, $\phi_6$, and $\phi_7$, where $\phi_4$ has a value of zero;

computing three phase differences $(\phi_5-\phi_4)$, $(\phi_6-\phi_5)$, and $(\phi_7-\phi_6)$ to produce $\Delta_{\phi54}$, $\Delta_{\phi65}$, $\Delta_{\phi76}$; and rounding $\Delta_{\phi54}$, $\Delta_{\phi65}$, $\Delta_{\phi76}$ to the nearest $\pi/2$;

accumulating the phase difference with other quantized phase differences;

thresholding amplitudes of the samples to eliminate a noise floor; and setting remaining non-zero amplitudes equal to one;

wherein a resulting third sequence comprises entries in a set $\{0, \exp(j2\pi/M)$ where p=0, 1, ..., (M−1)$\}$ which in the case M=4 turns out to be $\{0, 1, -1, j, -j\}$, where j is the imaginary number square root of −1; and applying the impulse response mask to the second sequence, enabling the device to produce an estimate of the channel impulse response of the transmission channel, wherein the estimate is produced without consideration of the continuous pilots.

2. The method of claim 1, generating a second sequence from the first sequence further comprising replicating the first sequence M times.

3. The method of claim 1, further comprising:

taking an (N*M)-point fast Fourier transform of the channel impulse response to produce a channel frequency response; and taking appropriate samples of the channel frequency response.

4. The method of claim 3, further comprising:

performing equalization using the channel frequency response to produce equalized data carriers.

5. The method of claim 4, further comprising:

cancelling inter-carrier interference of original data carriers using equalized data carriers.

6. The method of claim 5, further comprising:

performing a second equalization using the channel frequency response to produce equalized data carriers.

7. The method of claim 6, further comprising:

cancelling inter-carrier interference of the original data carriers a second time using equalized data carriers.

8. The method of claim 1, further comprising:

performing a phase slope correction of the first sequence.

9. The method of claim 1, further comprising:

collecting M successive third sequences;

computing a M-point row inverse fast Fourier transforms of the M third sequences to produce a channel impulse response;

unwrapping the channel impulse response; and setting to zero all the samples whose amplitude is less than the maximum of M, and setting to one all the samples whose amplitude is equal to M to generate the impulse response mask;

wherein the impulse response mask is a binary mask.

10. The method of claim 9, further comprising:

entering the binary mask into a sliding window of K masks; and majority-decoding each K-point row of the binary mask.

11. The method of claim 10, further comprising:
tapering any sharp edges of the binary mask;
wherein the mask is no longer binary after tapering.

12. A mobile channel estimation method to be employed in a demodulator, the method, comprising:
extracting scattered pilots of an orthogonal frequency division multiplexed (OFDM) symbol received by the demodulator, the OFDM symbol comprising both scattered pilots and continuous pilots;
obtaining a mask using the scattered pilots, but not the continuous pilots, of M successive symbols received by the demodulator, where M is a period of repetition of a scattered pilot pattern in successive OFDM symbols, obtaining the mask further comprising:
applying a phase slope correction to the scattered pilots, wherein the scattered pilots are first subjected to an N-point inverse fast Fourier transform;
quantizing a phase difference between the symbol and a previous symbol to multiples of $2\pi/M$ to produce a result, wherein the quantizing step comprises the following steps when M=4:
obtaining phase angles $\theta_4$, $\theta_5$, $\theta_6$, and $\theta_7$, from a row of a two-dimensional array, U;
subtracting set, $\theta_4$, from each of the phase angles, $\theta_4$, $\theta_5$, $\theta_6$, and $\theta_7$, resulting in angles $\phi_4$, $\phi_5$, $\phi_6$, and $\phi_7$, where $\phi_4$ has a value of zero;
computing three phase differences ($\phi_5-\phi_4$), ($\phi_6-\phi_5$), and ($\phi_7-\phi_6$) to produce $\Delta_{\phi54}$, $\Delta_{\phi65}$, $\Delta_{\phi76}$; and
rounding $\Delta_{\phi54}$, $\Delta_{\phi65}$, $\Delta_{\phi76}$ to the nearest $\pi/2$;
accumulating the result; and
computing a channel impulse response by the demodulator using the mask.

13. The mobile channel estimation method of claim 12, further comprising:
obtaining a second mask using scattered pilots of a (M+1)th orthogonal frequency division multiplexed symbol in combination with the scattered pilots of the (M−1) preceding symbols, wherein the (M+1)th symbol immediately follows the Mth symbol in time; and
performing a logical AND between the mask and the second mask, resulting in a third mask.

14. The mobile channel estimation method of claim 12, further comprising:
obtaining a plurality of masks using scattered pilots of a plurality of orthogonal frequency division multiplexed symbols, each of the plurality of symbols being obtained from a plurality of adjacent time periods;
storing the plurality of masks in a sliding buffer; and
computing a mask for a symbol based on a logical AND of the masks in the sliding buffer.

15. The mobile channel estimation method of claim 12, obtaining a mask using the scattered pilots further comprising:
computing an N-point inverse fast Fourier transform of the scattered pilots to generate a sequence;
using the sequence to get a new estimate of a binary mask; and
replicating the sequence M times.

16. The mobile channel estimation method of claim 12, obtaining a mask using the scattered pilots further comprising:
point-wise multiplying the replicated sequence with the binary mask to produce a impulse response in the time domain; and
computing the fast Fourier transform to produce a frequency domain channel response.

17. The mobile channel estimation method of claim 12, obtaining a mask of the scattered pilots further comprising:
thresholding out amplitudes of the result to eliminate a noise floor; and
setting remaining non-zero amplitudes to unity, resulting in an N-point sequence comprising an array with entries in the set $\{0, \exp(j2\pi p/M)$ where $p=0, \ldots, (M-I)\}$ which in the case M=4 turns out to be $\{0, 1, -1, j, -j\}$;
wherein the resulting N-point sequence is included in a two-dimensional array in which a first sequence is column zero, a second sequence is column one, a third sequence is column two, and a Mth sequence is column (M−I) of the array, a (M+I)th sequence replaces column zero, a (M+2)th sequence replaces column one, and so on.

18. The mobile channel estimation method of claim 17, obtaining a mask of the scattered pilots further comprising:
generating a first set of M-point inverse fast Fourier transforms along the rows of the array;
generating a new set of M-point inverse fast Fourier transforms for every received symbol;
wherein the samples with magnitudes equal to M are set to unity and others set to zero, where the value of M corresponds to the maximum possible output amplitude of the M-point inverse fast Fourier transform.

* * * * *